United States Patent
Mueller et al.

(10) Patent No.: US 9,853,537 B2
(45) Date of Patent: Dec. 26, 2017

(54) MULTILEVEL CONVERTER FOR POWER FACTOR CORRECTION AND ASSOCIATED OPERATING METHOD

(71) Applicant: SIEMENS AKTIENGESELLSCHAFT, Munich (DE)

(72) Inventors: Sebastian Mueller, Erlangen (DE); Martin Pieschel, Nuremberg (DE); Thilo Weigel, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 63 days.

(21) Appl. No.: 14/903,510

(22) PCT Filed: Jul. 8, 2013

(86) PCT No.: PCT/EP2013/064390
§ 371 (c)(1),
(2) Date: Jan. 7, 2016

(87) PCT Pub. No.: WO2015/003737
PCT Pub. Date: Jan. 15, 2015

(65) Prior Publication Data
US 2016/0164399 A1 Jun. 9, 2016

(51) Int. Cl.
*H02M 1/42* (2007.01)
*H02M 1/36* (2007.01)
(Continued)

(52) U.S. Cl.
CPC ........... *H02M 1/4216* (2013.01); *H02M 1/36* (2013.01); *H02M 7/49* (2013.01); *H02M 2007/4835* (2013.01); *Y02P 80/112* (2015.11)

(58) Field of Classification Search
CPC ........ H02M 1/36; H02M 1/42; H02M 1/4233; H02M 1/4225; H02M 1/4208;
(Continued)

(56) References Cited

U.S. PATENT DOCUMENTS

| 6,930,899 B2 * | 8/2005 | Bakran ................. H02M 7/487 |
| | | 363/132 |
| 7,710,082 B2 * | 5/2010 | Escobar |
| | | Valderrama ........... H02J 3/1857 |
| | | 323/207 |

(Continued)

FOREIGN PATENT DOCUMENTS

| WO | 2010051854 A1 | 5/2010 |
| WO | 2012167833 A1 | 12/2012 |

OTHER PUBLICATIONS

Hanson et al; "STATCOM: a new era of reactive compensation"; Power Engineering Journal, Institution of Electrical Engineers,: Bd. 16: pp. 151-160; ISSN: 0950-3366: DOI: 10. 1049/PE:20020308; XP002514401: 2002.

*Primary Examiner* — Adolf Berhane
(74) *Attorney, Agent, or Firm* — Laurence Greenberg; Werner Stemer; Ralph Locher

(57) ABSTRACT

A method operates a multilevel converter for power factor correction of a polyphase mains voltage. Each phase of the polyphase main has an associated phase module with a plurality of sub modules which are connected in series and each have an electrical energy store. Each sub module can be connected to the phase of the mains voltage or disconnected there from by an electronic switch. A circuit breaker is provided for disconnecting the converter from the mains voltage. The converter has a regulation system by which the voltages of the phase modules are balanced when the circuit breaker is open.

6 Claims, 2 Drawing Sheets

(51) Int. Cl.
*H02M 7/49* (2007.01)
*H02M 7/483* (2007.01)

(58) Field of Classification Search
CPC ........ H02M 3/285; H02M 7/08; H02M 7/153; H02M 7/17; H02M 7/521; H02M 7/53871; H02M 7/5387; H02J 3/16; H02J 3/46
USPC ............... 363/49, 65, 67, 68, 71, 98, 132; 323/205, 207
See application file for complete search history.

(56) References Cited

U.S. PATENT DOCUMENTS

| | | | |
|---|---|---|---|
| 7,800,348 B2 * | 9/2010 | Zargari | H02J 3/1892 323/207 |
| 8,345,455 B2 * | 1/2013 | Jeon | H02M 7/49 363/132 |
| 8,514,597 B2 | 8/2013 | Svensson | |
| 8,619,446 B2 * | 12/2013 | Liu | H02M 1/12 363/71 |
| 8,760,120 B2 | 6/2014 | Hasler | |
| 8,982,593 B2 * | 3/2015 | Nondahl | H02M 1/12 363/36 |

* cited by examiner

MULTILEVEL CONVERTER FOR POWER FACTOR CORRECTION AND ASSOCIATED OPERATING METHOD

BACKGROUND OF THE INVENTION

Field of the Invention:

The present invention relates to a method for the operation of a multilevel power converter for the reactive power compensation of a multiphase grid voltage, wherein a phase module including multiple submodules connected in series, each including an electric energy store, is associated with each phase, wherein each submodule may be connected to the phase of the grid voltage or may be disconnected from it with the aid of an electronic switch, and including a circuit breaker for disconnecting the power converter from the grid voltage.

Power converters of this type are used for the compensation of reactive power in an electrical grid. In this way, the voltage quality and stability in the power supply grid are improved, so that fluctuating energy sources such as offshore wind farms or photovoltaic systems may be connected to an electrical grid.

Power converters of this type are provided by the applicant under the name of SVC PLUS. These are modular multilevel power converters which are capable of generating a virtually sinusoidal voltage. The power converter is made up of multiple phase modules, one phase module being provided for each phase. Each phase module comprises a plurality of energy stores connected in series which act as a voltage source. The many voltage sources connected in series act as a voltage divider, via which the desired grid voltage having a sinusoidal profile is generated. Each of these voltage sources may include an energy store designed as a capacitor and a switch designed as an IGBT (insulated-gate bipolar transistor). Control electronics switch the power transistors in such a way that the capacitor may be bridged or activated as required, so that practically any desired voltage may be set.

In addition, the multilevel power converter includes a circuit breaker via which a disconnection of the power converter from the grid voltage may take place, for example, if a fault occurs in a device connected to the power converter. As soon as the power converter is disconnected from the three-phase grid voltage, the electric energy stores, preferably capacitors, in the submodules of the phase modules discharge unequally. This unequal voltage distribution also exists during reconnection, thus impeding the transition to controlled operation. In practice, several minutes must therefore elapse until the electrical energy stores in the submodules are almost completely discharged. In this operating state, after a disconnection via the circuit breaker, the power converter is not able to perform its function of stabilizing the grid voltage. In these cases, it is therefore necessary to revert to other devices, the use of which, however, has disadvantages such as the generation of severe grid distortions and a low dynamic response.

BRIEF SUMMARY OF THE INVENTION

The object of the present invention is therefore to provide a method for the operation of a multilevel power converter for reactive power compensation which makes a rapid reconnection possible after a disconnection of the power converter from the grid voltage.

To achieve this object, according to the present invention, it is provided in a method of the kind initially specified that the power converter includes a controller via which the voltage of the phase modules is balanced while the circuit breaker is open.

The present invention is based on the finding that following a disconnection from the grid, the power converter may be rapidly reconnected if the energy stored in the sub modules is equally or symmetrically distributed. At the point in time of the disconnection from the grid, because of the previously harmonically superimposed profile of the energies, an asymmetrical state generally exists which is responsible for an asymmetrical profile of the decay process due to the varying power dissipation of the sub modules.

In the method according to the present invention, a balancing of the stored energy is carried out, whereby the existing energy is symmetrically distributed. For this purpose, according to the present invention, a controller is used which actively controls the individual submodules.

In the method according to the present invention, it is preferred that the phase modules are connected in a delta configuration and are supplied with voltages while the circuit breaker is open for balancing the energy in a targeted manner via the controller. Due to the delta configuration, an identical circulating current flows through the phase modules, onto which phase module voltages chosen in a targeted manner are superimposed. In this way, the desired energy store balance between the phase modules and the electrical energy stores of the submodules is achieved. Subsequently, an unequal distribution of the existing energy is prevented, so that the power converter is permanently in an equally or symmetrically charged state, whereby a renewed connection of the power converter disconnected from the grid is possible at any time.

In the method according to the present invention, it is particularly preferred that the balancing of the voltages of the phase modules comprises the following steps:

calculating the energy stored in the energy stores of the phase modules, calculating a control error of the individual energy stores, routing the control errors to a controller, generating a sinusoidal AC voltage in a function generator, associating the output signals of the controller with the AC voltage, and controlling the submodules for adjusting the voltages.

In this method, the energy stored in the energy stores of the phase modules is preferably ascertained as a scaled sum of the individual squared energy store voltages; an energy store is preferably designed as a capacitor or a battery. The method step of calculating a control error of the individual energy stores takes place at a setpoint value of 0; the deviation of the energies of the individual energy stores is thus minimized via the controller. Following the generation of the sinusoidal AC voltage in the function generator, this voltage is superimposed with the output signals of the controller, so that voltages for the individual phases are obtained. The method according to the present invention is preferably used in an electrical grid having three phases.

In a further embodiment of the method, it may be provided that the energy stored in the energy stores undergoes an alpha-beta transformation and that, following the association of the output signals with the sinusoidal periodic quantity, a back-transformation takes place, whereby a voltage is associated with each phase. Via this transformation, a three-phase quantity, in this case, the voltages of the three phases, may be transformed into a two-axis coordinate system.

In addition, the present invention relates to a multilevel power converter for the reactive power compensation of a multiphase grid voltage, wherein a phase module including multiple submodules connected in series, each including an electrical energy store, is associated with each phase, wherein each submodule may be connected to the phase of the grid voltage or may be disconnected from it with the aid of an electronic switch, and including a circuit breaker for disconnecting the power converter from the grid voltage.

The power converter according to the present invention is characterized in that it includes a controller which is designed for balancing the voltages of the phase modules while the circuit breaker is open.

In the power converter according to the present invention, the electrical energy store of a submodule is preferably designed as a capacitor or battery.

Additional embodiments of the present invention are described in the sub claims.

The present invention is explained below based on an exemplary embodiment, with reference to the drawings. The drawings are schematic representations.

DESCRIPTION OF THE INVENTION

Figure 1:
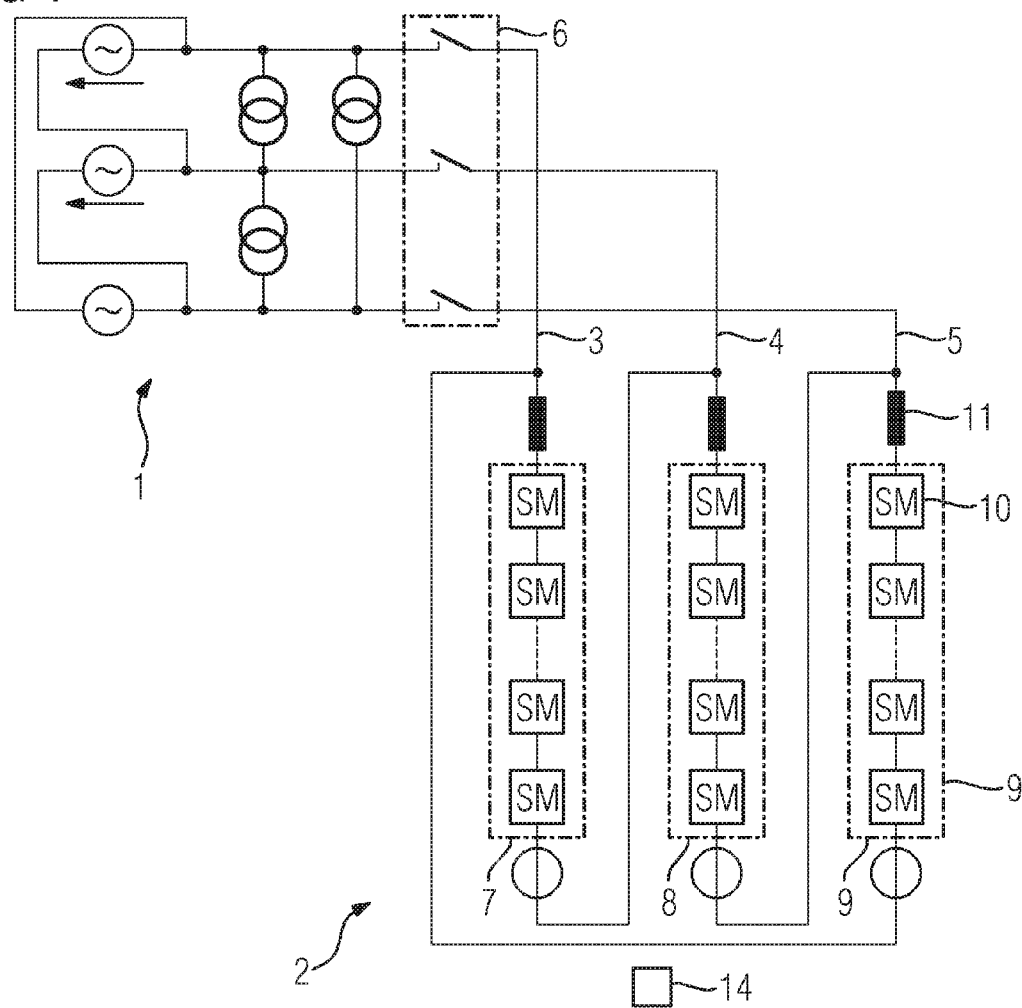
FIG. 1 shows a circuit diagram of a power converter according to the present invention, which is suitable for carrying out the method according to the present invention.

FIG. 1 shows a three-phase electrical grid 1, to which a multilevel power converter 2 is connected. In the depicted exemplary embodiment, the electrical grid 1 has three phases 3, 4, 5. A circuit breaker 6 is connected between the power converter 2 and the electrical grid 1, so that the power converter 2 may be disconnected from the electrical grid 1 if a fault occurs, for example, in the case of a malfunction of a device connected to the power converter 2.

The power converter 2 comprises phase modules 7, 8, 9, each of which being associated with one of the phases 3, 4, 5. Each phase module 7, 8, 9 comprises multiple submodules 10 connected in series; in addition, an inductor 11 is associated with each phase module 7, 8, 9.

Figure 2:
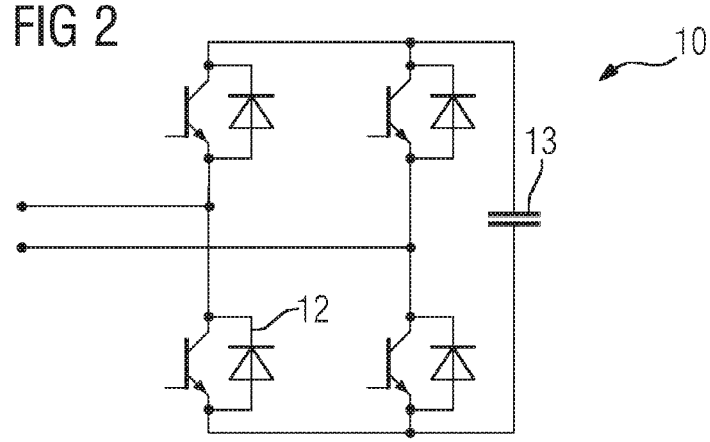
FIG. 2 shows a circuit diagram of a submodule of the power converter according to the present invention.

FIG. 2 shows the submodule 10, which, in the depicted exemplary embodiment, includes four power semiconductors 12 (IGBTs) and a capacitor 13 acting as an electric energy store. The submodule 10 is connected as an H bridge, which is also referred to as a full bridge. Energy may either be withdrawn from the capacitor 13, or energy may be transferred to it, via a corresponding control of the individual power semiconductors 12, so that the voltage of the submodule 10 may be precisely adjusted.

Since the power converter 2 as shown in FIG. 1 includes multiple or many such submodules 10 connected in series, a particular voltage may be generated rapidly and with high accuracy. Disturbances or asymmetries in the three-phase grid voltage of the electrical grid 1 may thus be balanced via a corresponding coordinated control of the submodules 10 of the three phase modules 7, 8, 9. The power converter 2 is used primarily for reactive power compensation.

If the circuit breaker 6 is opened following a disturbance, thereby disconnecting the power converter 2 from the electrical grid 1, the capacitors 13 of the individual submodules 10 of the phase modules 7, 8, 9 would discharge asymmetrically, whereby an unequal energy distribution would occur.

In this state, it is not possible to connect the power converter 2; instead, several minutes must elapse until the capacitors 13 are largely discharged.

The phase modules 7, 8, 9 of the power converter 2 are connected to each other in a delta configuration; therefore, an identical current flows between the phase modules 7, 8, 9.

The power converter 2 includes a controller 14 via which an energy exchange is produced between the phase modules 7, 8, 9, so that the power converter may be reconnected to the electrical grid without delay following a disconnection process.

Each phase module 7, 8, 9 is controlled via the controller 14 in such a way that a voltage occurs which drives a current across the associated inductor 11 of each phase module 7, 8, 9. If the circuit breaker 6 is open, the currents between the individual phase modules 7, 8, 9 are identical; a circulating current exists. This circulating current is controllable via the zero-sequence component of the phase module voltages. An energy balance between the phase modules 7, 8, 9 and the capacitors 13 of the submodules 10 is achieved via a targeted superimposition of additional phase module voltages which are free of zero-phase sequences, which are predefined by the controller 14. As a result, an unequal distribution of the voltages of the capacitors 13 is prevented, so that the power converter 2 may be immediately reconnected, in order to compensate the reactive power in the electrical grid 1.

Figure 3:
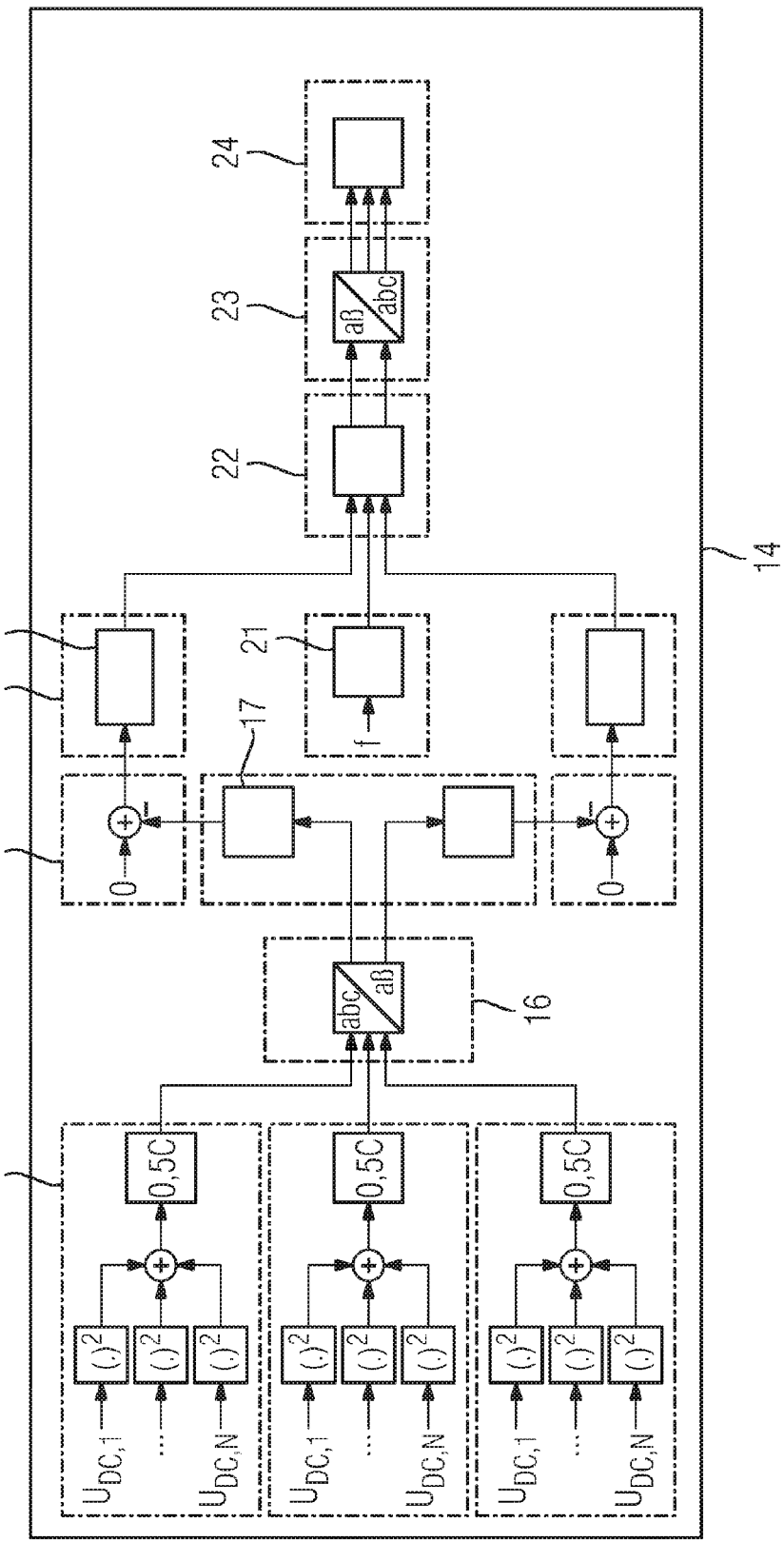
FIG. 3 shows the sequence of the control in the method according to the present invention.

The balancing of the average capacitor voltages between the phase modules 7, 8, 9 is explained based on FIG. 3.

The balancing takes places via the controller 14, wherein in a first step 15, the energy stored in the energy stores of the phase modules 7, 8, 9 is calculated. The calculation of the phase module energies is carried out by calculating the scaled sum of the individual squared capacitor voltages of the capacitors 13 of the submodules 10. The ascertainment of the energies is carried out separately for each phase module 7, 8, 9. Subsequently, an alpha-beta transformation 16 is carried out, whereby the system comprising three quantities is transformed into a two-axis system. In the next step 17, the calculated energies undergo filtering. Subsequently, in the next step 18, the control error of the individual energy components is calculated at the set point value 0. In step 19, the control error is provided to a controller 20, which ascertains a controlled variable from it.

A frequency generator 21 generates a sinusoidal AC voltage having a frequency f. This frequency f is independent of the frequency of the grid voltage in the electrical grid 1. The controlled variables of the frequency f generated by the frequency generator 21, which are determined by the controller 20, are impressed via a rotation 22. Subsequently, a back-transformation 23 of the alpha-beta system into the three-phase voltage system takes place. As a result, three-phase converter voltages are obtained. The individual submodules 10 of the phase modules 7, 8, 9 are adjusted via a control device 24, whereby the desired symmetrical energy distribution results.

Although the present invention has been illustrated and described in greater detail via the preferred exemplary embodiment, the present invention is not limited by the disclosed examples, and other variations may be derived from it by those skilled in the art without departing from the protective scope of the present invention.

The invention claimed is:

1. A method for operating a multilevel power converter for reactive power compensation of a multiphase grid voltage, the multilevel power converter containing phase modules each having multiple sub-modules connected in series and each of the sub-modules having an electric energy store, the phase modules each being associated with a phase, each of the sub-modules being connected to the phase of the multiphase grid voltage or being disconnected from the phase with an aid of an electronic switch, which comprises the steps of:

disconnecting the multilevel power converter from the multiphase grid voltage via a circuit breaker; and providing a controller via which voltages of the phase modules are balanced while the circuit breaker is open, a balancing of the voltages of the phase modules include the following additional steps of:

calculating energy stored in electrical energy stores of the phase modules:

calculating a control error of individual ones of the electrical enemy stores;

routing the control error to a subcontroller of the controller;

generating a sinusoidal AC voltage in a function generator:

associating output signals of the controller with the sinusoidal AC voltage; and controlling the sub-modules for adiusting the voltages.

2. The method according to claim 1, which further comprises connecting the phase modules in a delta configuration and are supplied with the voltages while the circuit breaker is open for balancing energy in a targeted manner via the controller.

3. The method according to claim 1, wherein the energy stored in the electric energy stores undergoes an alpha-beta transformation, and following an association of the output signals, a back-transformation takes places, so that a voltage is associated with each of the phases.

4. A multilevel power converter for reactive power compensation of a multiphase grid voltage, the multilevel power converter comprising:

phase modules each having multiple sub-modules connected in series and each of said sub-modules having an electric energy store, each of said phase modules being associated with a phase of the multiphase grid voltage, wherein each of said sub-modules having an electronic switch and may be connected to the phase of the multiphase grid voltage or may be disconnected from the multiphase grid voltage with an aid of said electronic switch;

a circuit breaker for disconnecting the multilevel power converter from the multiphase grid voltage; and a controller configured for balancing voltages of said phase modules while said circuit breaker is open and having a function generator and a subcontroller, said controller being programmed to perform the balancing of the voltages of said phase modules by performing the following steps of:

calculating energy stored in electrical energy stores of said phase modules;

calculating a control error of individual ones of said electrical enemy stores;

routing the control error to said subcontroller of said controller;

generating a sinusoidal AC voltage in said function generator;

associating output signals of said controller with the sinusoidal AC voltage; and controlling said sub-modules for adiusting the voltages.

5. The multilevel power converter according to claim 4, wherein said electric energy store of at least one of said sub-modules is selected from the group consisting of capacitors and batteries.

6. The multilevel power converter according to claim 4, wherein said controller is configured to subject energy stored in said electric energy stores to an alpha-beta transformation, as well as a back transformation, in order to associate a voltage with each said phase.

\* \* \* \* \*